No. 778,429. Patented December 27, 1904.

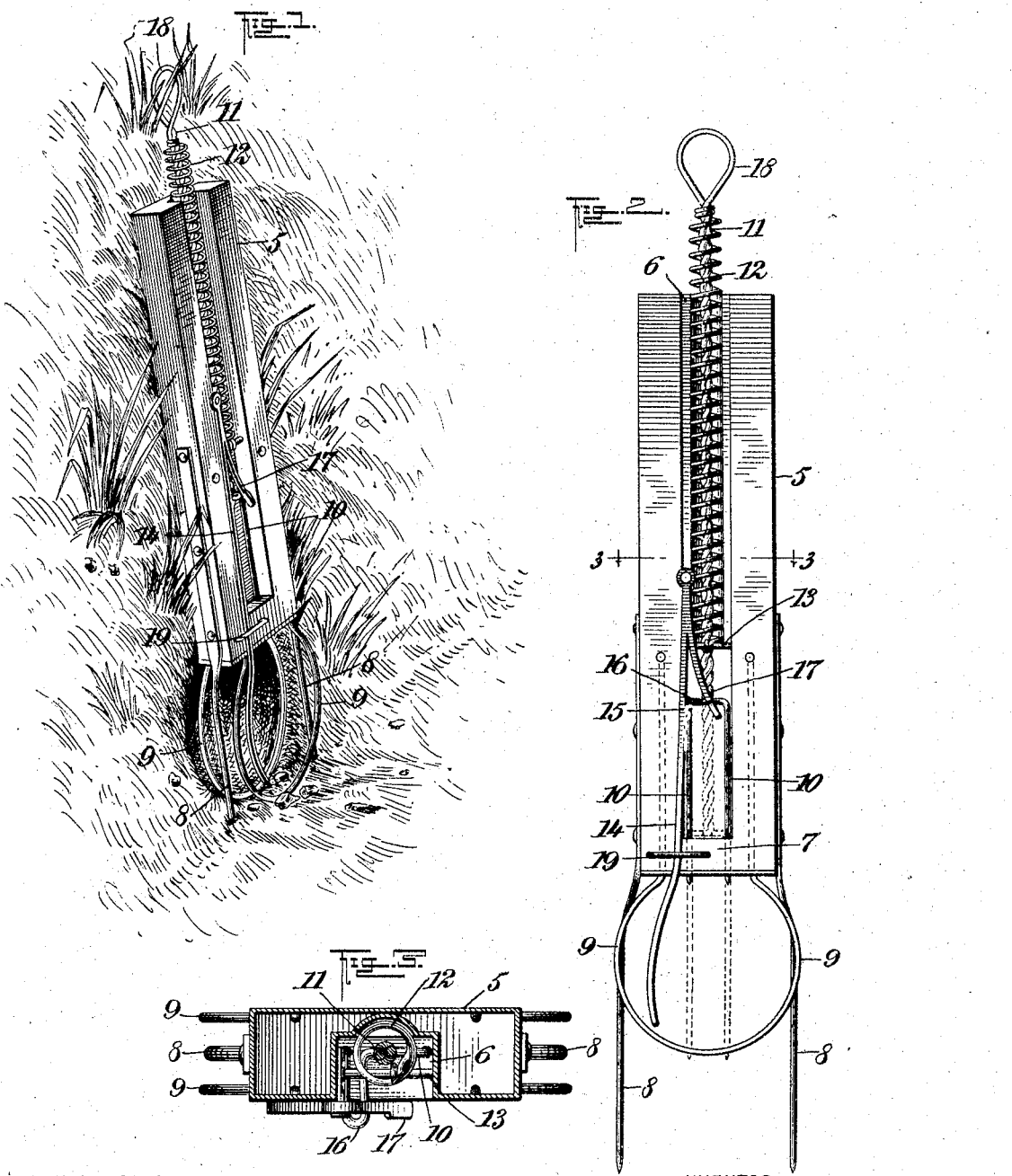

UNITED STATES PATENT OFFICE.

LUTHER M. STEELSMITH, OF TROY, IDAHO.

ANIMAL-TRAP.

SPECIFICATION forming part of Letters Patent No. 778,429, dated December 27, 1904.

Application filed March 18, 1904. Serial No. 198,744.

*To all whom it may concern:*

Be it known that I, LUTHER M. STEELSMITH, a citizen of the United States, and a resident of Troy, in the county of Latah and State of Idaho, have invented a new and Improved Animal-Trap, of which the following is a full, clear, and exact description.

This invention relates to improvements in traps for catching small animals, such as gophers, squirrels, and the like, the object being to provide a trap of simple and inexpensive construction and so arranged as to catch and hold the animal when passing from or into a hole in the ground.

I will describe an animal-trap embodying my invention and then point out the novel features in the appended claims.

Reference is to be had to the accompanying drawings, forming a part of this specification, in which similar characters of reference indicate corresponding parts in all the figures.

Figure 1 is a perspective view of an animal-trap embodying my invention. Fig. 2 is a front elevation thereof, and Fig. 3 is a section on the line 3 3 of Fig. 2.

The trap comprises the body 5, consisting of any suitable metal, such as stamped metal, and extended longitudinally of the body and at the front is a channel 6, the bottom of which is closed by a cross-piece 7. Extended downward from the body are prongs 8, designed to be forced into the ground to hold the trap in position, and the lower end of the trap is provided with loops or rings 9, which are approximately the size of the hole through which the animal passes. Movable through openings in the cross-piece 7 are the spikes or prongs 10, designed to pass into the neck or body of the animal. Extended upward from the prongs 10 is the stem 11, and surrounding this stem within the channel 6 is a spring 12, the upper end of said spring being connected to the stem and at the lower end to a cross-pin 13.

Arranged to swing on the body and extended downward across the front ring 9 is a detent member 14, having a lug 15 designed to engage underneath a forward projection 16 on the upper portion of one of the prongs 10 to hold the prongs in elevated position, as indicated in the drawings. Extended downward and at an outward incline from the rod 14 is an arm 17 which when the prongs 10 are moved upward by drawing upward on the handle 18 will engage with the projection 16, moving the bar inward so that the lug 15 will engage underneath the projection.

It will be noted that the lower end of the bar or member 14 is at one side of the center of the rings 9. Therefore when the trap is in position as indicated in Fig. 1 and the animal attempts to pass through the rings he will force the member 14 laterally, disengaging the lug 15 from the projection 16, so that the spring 12 will force the prongs 10 downward into the animal. The member 14 will be limited in its movements by means of a loop 19.

Having thus described my invention, I claim as new and desire to secure by Letters Patent—

1. An animal-trap comprising a body portion having a longitudinal channel closed by a cross-piece at the lower end, the said cross-piece having openings, puncturing-prongs movable through said openings, a stem extended upward from the prongs and through the channel in the body, a pin extended across said channel, a spring surrounding the stem and connected at its lower end to said pin and at its upper end to the stem, and prongs attached to the body for insertion into the ground.

2. An animal-trap comprising a body portion, puncturing-prongs movable therein, a spring for moving the prongs in one direction, a detent-rod having a lug for engaging with a portion of the prongs to hold the same in elevated position, and a downwardly and outwardly curved part rigidly connected to said rod for engaging with the part carried by the prongs to shift the lug underneath said part.

3. An animal-trap comprising a body having a longitudinal channel closed at the lower end by a cross-piece, said cross-piece having openings, puncturing-prongs movable through said openings, a stem extended upward from the prongs in the channels, a spring surrounding the stem and connected at its upper end thereto, a pin in the body with which the lower end of the spring connects, a swinging detent for the prongs, the said detent having a portion extended below the body, a pair of rings or loops secured to the lower end of the body, and ground-penetrating prongs extended from the body.

In testimony whereof I have signed my name to this specification in the presence of two subscribing witnesses.

LUTHER M. STEELSMITH.

Witnesses:
JOHN B. RICKETTS, Jr.,
R. B. FISHER.